United States Patent [19]

Beltrame et al.

[11] Patent Number: 5,343,128
[45] Date of Patent: Aug. 30, 1994

[54] DRIVE ASSISTANCE DEVICE FOR A GOLF BUGGY

[76] Inventors: Carlo L. Beltrame, 13 York Street, East Ivanhoe, 3079 Victoria; Arthur J. Barnes, 33 Carthy Street, North Altona, 3025 Victoria, both of Australia

[21] Appl. No.: 934,743
[22] PCT Filed: Apr. 12, 1991
[86] PCT No.: PCT/AU91/00137
    § 371 Date: Oct. 9, 1992
    § 102(e) Date: Oct. 9, 1992
[87] PCT Pub. No.: WO91/16755
    PCT Pub. Date: Oct. 31, 1991

[30] Foreign Application Priority Data

Apr. 12, 1990 [AU] Australia .................. PJ9619

[51] Int. Cl.$^5$ ............................. H02K 7/14
[52] U.S. Cl. ......................... 318/3; 318/296; 310/156; 310/67 R; 280/DIG. 5
[58] Field of Search ............. 310/67 R, 156; 318/3, 318/9–10, 14, 281, 296–300, 818, 822–823; 180/19.1, 19.2; 280/DIG. 5, 42

[56] References Cited

U.S. PATENT DOCUMENTS

| 2,506,146 | 4/1947 | Gladish ................. 172/287 |
| 2,711,027 | 6/1955 | Williamson . | |
| 3,225,853 | 12/1965 | Norton et al. . | |
| 3,569,804 | 3/1971 | Studer .................. 318/138 |
| 3,753,473 | 8/1973 | Hollis ................... 180/19 H |
| 3,867,993 | 2/1975 | Iizuka ................... 180/19 R |
| 4,012,651 | 3/1977 | Burson ................... 310/153 |
| 4,128,778 | 12/1978 | Merkle et al. .......... 310/67 R |
| 4,684,855 | 8/1987 | Kallos .................... 318/254 |
| 4,712,028 | 12/1987 | Horber ................... 310/49 R |
| 4,827,164 | 5/1989 | Horber ................... 310/49 R |
| 4,913,258 | 4/1990 | Sakurai et al. ......... 180/242 |
| 5,045,742 | 7/1991 | Armstrong et al. .... 310/254 |

FOREIGN PATENT DOCUMENTS

| 39667/85 | 9/1985 | Austria . |
| 44096/85 | 12/1985 | Austria . |
| 0337032 | 10/1989 | European Pat. Off. . |
| 2561953 | 9/1985 | France . |
| 52-22215 | 2/1977 | Japan . |
| 4222214 | 2/1977 | Japan . |
| 63-251324 | 10/1988 | Japan . |
| 7506256 | 11/1976 | Netherlands . |
| 1397279 | 6/1975 | United Kingdom . |

Primary Examiner—William M. Shoop, Jr.
Assistant Examiner—David Martin
Attorney, Agent, or Firm—Kerkam, Stowell, Kondracki & Clarke

[57] ABSTRACT

A device for at least partially driving a vehicle, such as a golf buggy, a trolley, or a parcel carrier, which is adapted to be pushed or pulled by an operator in a forward or a reverse direction. The device comprises a wheel adapted to rotate about an axle of the vehicle, the wheel having an internal chamber; and an electromagnetic assembly located in the chamber operable to provide drive for the vehicle.

7 Claims, 3 Drawing Sheets

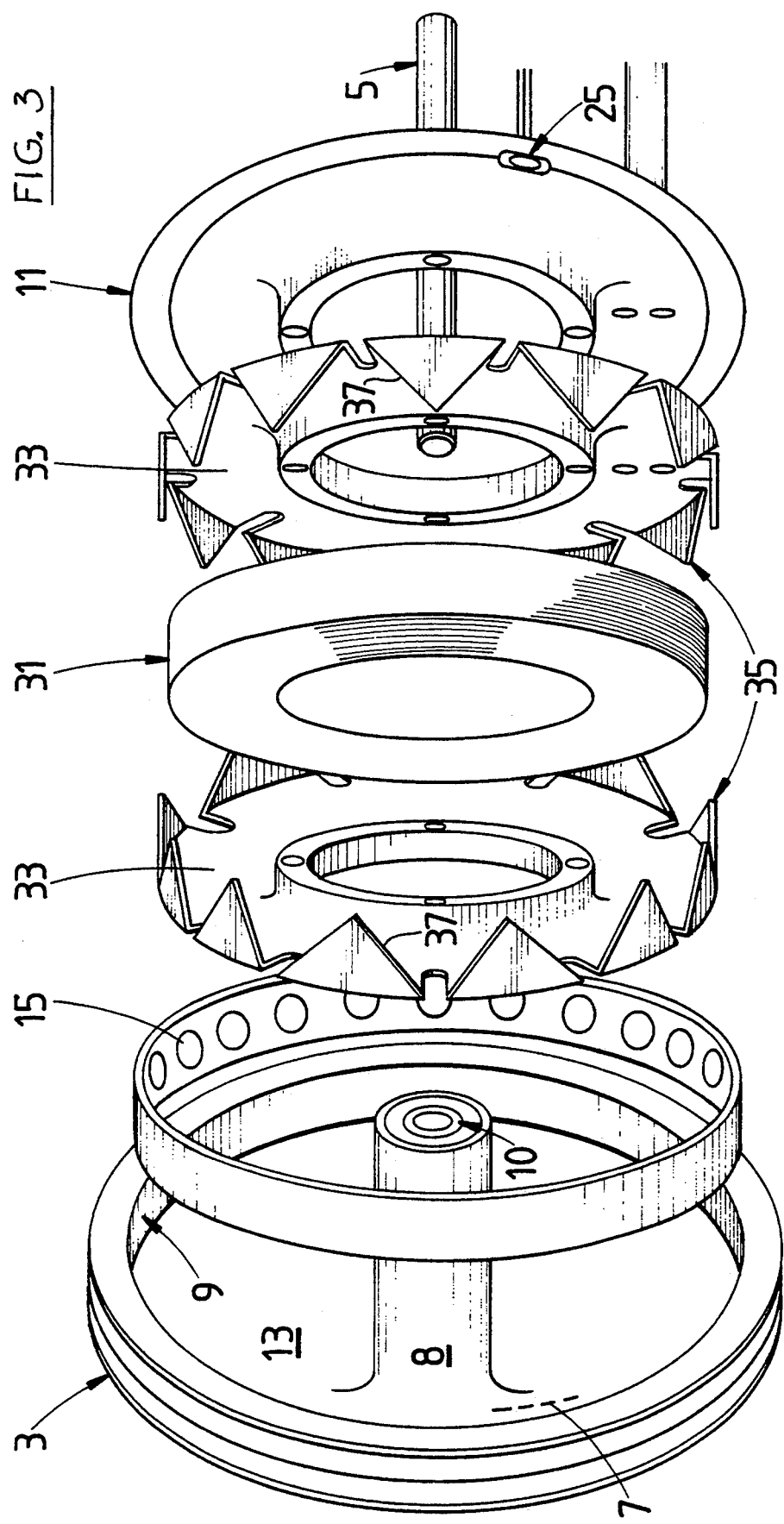

DRIVE ASSISTANCE DEVICE FOR A GOLF BUGGY

The present invention relates to a drive assistance device for a vehicle, such as a golf buggy (referred to as a "cart" in the U.S.), trolley or parcel carrier, which is adapted to be pushed or pulled by an operator in either a forward or a reverse direction.

BACKGROUND OF THE INVENTION

A conventional golf buggy comprises a support frame for a golf bag mounted on a pair of wheels. In use, a golfer either pushes or pulls the golf buggy. For many golfers the necessity to push or pull the conventional golf buggy is particularly tiresome and detracts from the pleasure of playing golf, and in some instances, particularly in the case of older golfers, limits the extent to which the golfers can play golf.

SUMMARY OF THE INVENTION

It is known to motorise golf buggies by mounting a motor to the support frame and coupling the motor through a transmission system, such as gears or chains, to the wheels. However, such motorised golf buggies are noisy, cumbersome and often difficult to use.

An object of the present invention is to provide a drive assistance device for a golf buggy which alleviates the disadvantages of the conventional and motorised golf buggies described in the preceding paragraphs.

According to the present invention there is provided a device for at least partially driving a vehicle, such as a golf buggy, a trolley, or a parcel carrier, which is adapted to be pushed or pulled by an operator in a forward or a reverse direction, the device comprising;

(a) a wheel adapted to rotate about an axle of the vehicle, the wheel having an internal chamber; and (b) an electromagnetic assembly located in the chamber operable to provide drive for the vehicle.

It is preferred that the vehicle is a golf buggy.

It is preferred that the electromagnetic assembly comprises a plurality of spaced-apart magnets arranged in a circular array for rotation with the wheel and an electromagnetic field coil for generating a magnetic field located in a stationary position with respect to the magnets between the axle and the magnets. It is particularly preferred that the magnets are connected to a circumferential wall of the chamber.

It is preferred that the device further comprises a dc power source connected to the electromagnetic field coil.

It is preferred that the magnets are button magnets arranged so that one end of each magnet faces the chamber and the ends of adjacent magnets are of opposite polarity.

It is preferred that the device comprises a control means to alternate the polarity of the magnetic field.

With such an arrangement, when an electric current is passed through the electromagnet field coil, the magnetic field produced initially attracts the magnet of opposite polarity located closest to the electromagnetic field coil towards the electromagnetic field coil and subsequently repels the magnet when the polarity of the magnetic field alternates in response to the control means when the magnet is in the position which is the shortest possible distance from the electromagnetic field coil. Thus, when a golfer initiates movement of the golf buggy in a forward or reverse direction the attraction and repulsion of the magnets with respect to the electromagnetic field coil has the combined effect of assisting the drive of the wheel in the forward or reverse direction.

It is preferred that the electromagnetic field coil is positioned so that there is an annular gap between the electromagnetic field coil and the magnets.

It is preferred that the electromagnetic field coil is adapted to generate a plurality of magnetic fields of opposite polarity around an outer surface of the electromagnetic field coil that faces the magnets.

It is preferred that the electromagnetic field coil comprises a continuous coil of wire, a first plate which extends across one side of the wire coil and terminates in a series of spaced apart fingers which form a part of the outer surface of the electromagnetic field coil, and a second plate which extends across the other side of the wire coil and terminates in a series of spaced apart fingers which form another part of the outer surface of the electromagnetic field coil, wherein the fingers of the first plate alternate with the fingers of the second plate. With such an arrangement, when a direct current is passed through the wire coil the magnetic field generated is transferred to the plates with the result that the polarity of the magnetic field of the fingers of the first plate is opposite to that of the fingers of the second plate.

It is preferred that there are the same number of magnets and fingers.

It is preferred that each finger is triangular with the apex positioned proximate the respective opposite side of the electromagnetic field coil.

It is preferred particularly that the edges of adjacent triangular fingers are parallel.

It is preferred that the dc power source is rechargeable. In one particularly preferred arrangement the dc power source comprises a removable battery pack. The removable battery pack may be located either in the chamber or externally in close proximity to the chamber. For example, the removable battery pack may be located on the stationary side wall of the wheels.

It is preferred that the device further comprises a switch assembly to actuate the device. In one particularly preferred arrangement the switch assembly comprises multiple settings to provide variable drive assistance.

It is preferred that the device further comprises a magnetic field sensor located in the chamber to measure wheel rotations and a trip meter located externally of the wheel and operatively coupled to the magnetic field sensor to provide an indication of the distance travelled by the wheel.

According to the present invention there is also provided a vehicle, such as a golf buggy, a trolley, or a parcel carrier, adapted to be pushed or pulled by an operator in a forward or a reverse direction, the vehicle comprising a device for at least partially driving the vehicle as described in the preceding paragraphs.

BRIEF DESCRIPTION OF THE DRAWINGS

The present invention is described hereinafter in more detail with reference to the accompanying drawings in which:

FIG. 3 is a partially disassembled perspective view of the drive device shown in FIG. 2.

DETAILED DESCRIPTION OF THE INVENTION

The preferred embodiments of a device for at least partially driving a vehicle in accordance with the present invention shown in the figures are particularly adapted for use in connection with golf buggies and will be described in this context. However, it is emphasized that the present invention is not limited to this application and extends to vehicles, such as golf buggies, trolleys and parcel carriers, which are adapted to be pushed or pulled by an operator in a forward or a reverse direction.

Figure 1:
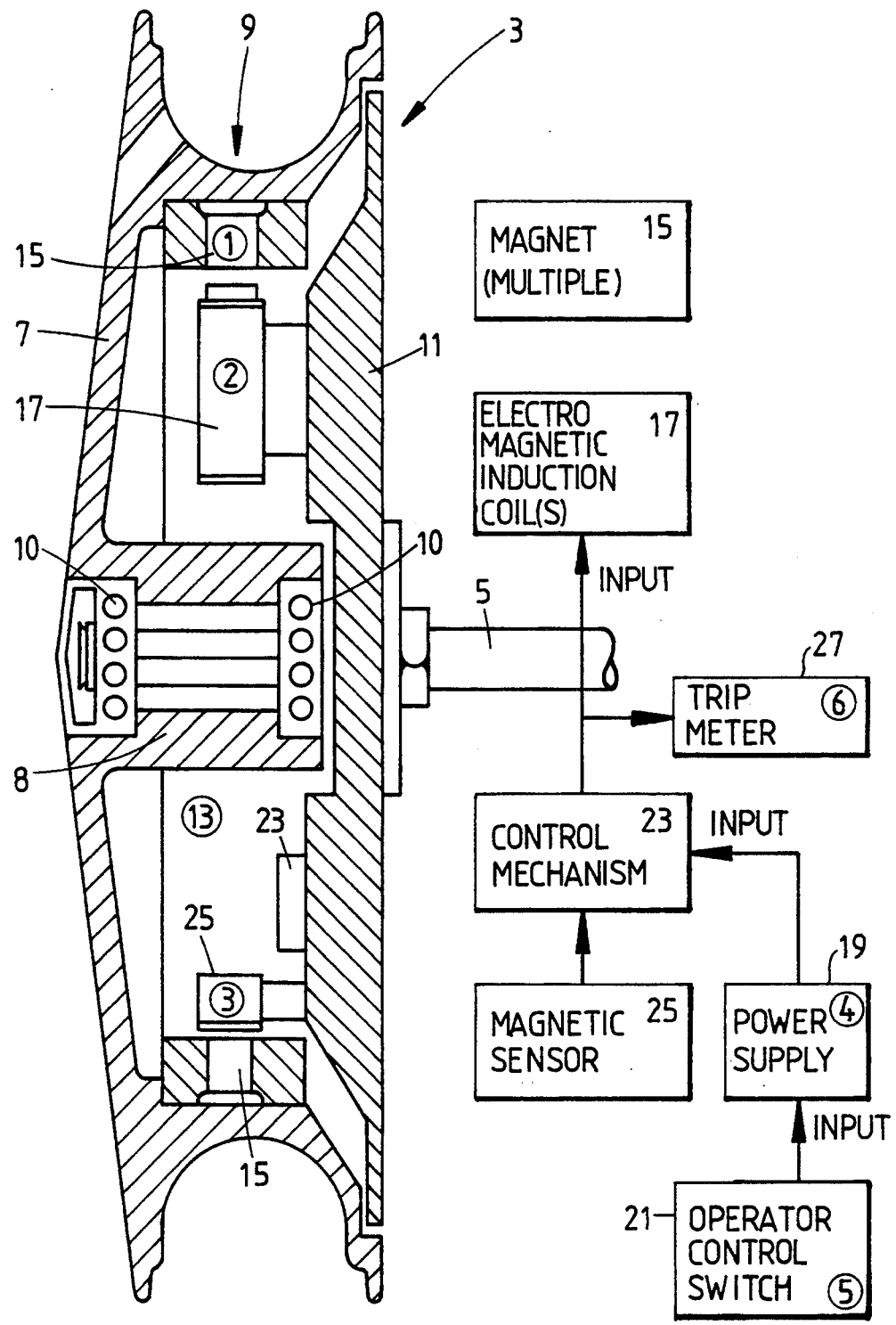
FIG. 1 is a partially schematic sectional view of a preferred embodiment of a drive device in accordance with the present invention.

The main components of the device shown in FIG. 1 are a golf buggy wheel 3 which is generally conventional in terms of external appearance and an electromagnetic drive assembly which is operable in use to at least partially drive the golf buggy in either a forward or a reverse direction.

The wheel 3 is detachably mounted to an axle 5 of a conventional golf buggy. The wheel 3 comprises;

(a) an outer side wall 7 and a circumferential wall 9 which are integrally formed and are arranged for rotation about the axle 5; and (b) a stationary inner side wall 11 connected to the axle 5.

The wheel 3 further comprises a chamber 13 which houses the main components of the electromagnetic drive assembly as is described hereinafter.

The outer side wall 7 comprises a centrally located hub 8 which extends over the axle 5 and is supported by bearings 10 so that the outer side wall 7 and the integrally formed circumferential wall 9 can rotate freely about the axle 5.

The electromagnetic drive assembly comprises, a plurality of equi-spaced button magnets 15 connected to the circumferential wall 9 in a circular array so that one end of each magnet 15 faces the chamber 13 and adjacent magnets 15 are of opposite polarity, and an electromagnetic field coil 17 connected to the inner wall 11.

A rechargeable battery pack 19 is connected to the electromagnetic field coil 17 and is operable on actuation of an operator control switch 21 to energize the electromagnetic field coil 17 to generate a magnetic field.

The drive device further comprises a magnetic sensor 25 to detect the position of the magnets 15 in relation to the electromagnetic field coil 17 and a control device 23 to alternate the polarity of the magnetic field when the magnetic sensor 25 detects that a magnet 15 is in a position which is the shortest possible distance from the electromagnetic field coil 17.

In use, when an operator selectively actuates the control switch 21 to operatively connect the battery pack 19 to the electromagnetic field coil 17 and thereby generates a magnetic field, the magnetic field initially attracts the magnet 15 of opposite polarity located closest to the electromagnetic field coil 17 to move the wheel about the axle to bring the magnet 15 closer to the electromagnetic field coil 17 and thereby drive the golf buggy in a forward or reverse direction. The control device 23 alternates the polarity of the electromagnetic field coil 17 when the magnetic sensor 25 detects that the magnet 15 is at a position which is the shortest possible distance from the electromagnetic field 17. As a consequence, the electromagnetic field coil 7 repels the magnet 15 and simultaneously attracts the following magnet 15 to further drive the golf buggy in the forward or reverse direction. It can be seen from the foregoing that the combined effect of the alternating attraction and the repulsion of the magnets with the change in polarity of the magnetic field is to drive the golf buggy in a selected direction of movement.

The device further comprises a trip meter 27 coupled to the magnetic sensor 25 to provide an indication of the distance travelled by the wheel 3.

The device further comprises a means (not shown) operable to reverse the magnetic field so as to retard the movement of the wheel as may be required when the golf buggy is travelling downhill or in an overspeed condition.

Figure 2:
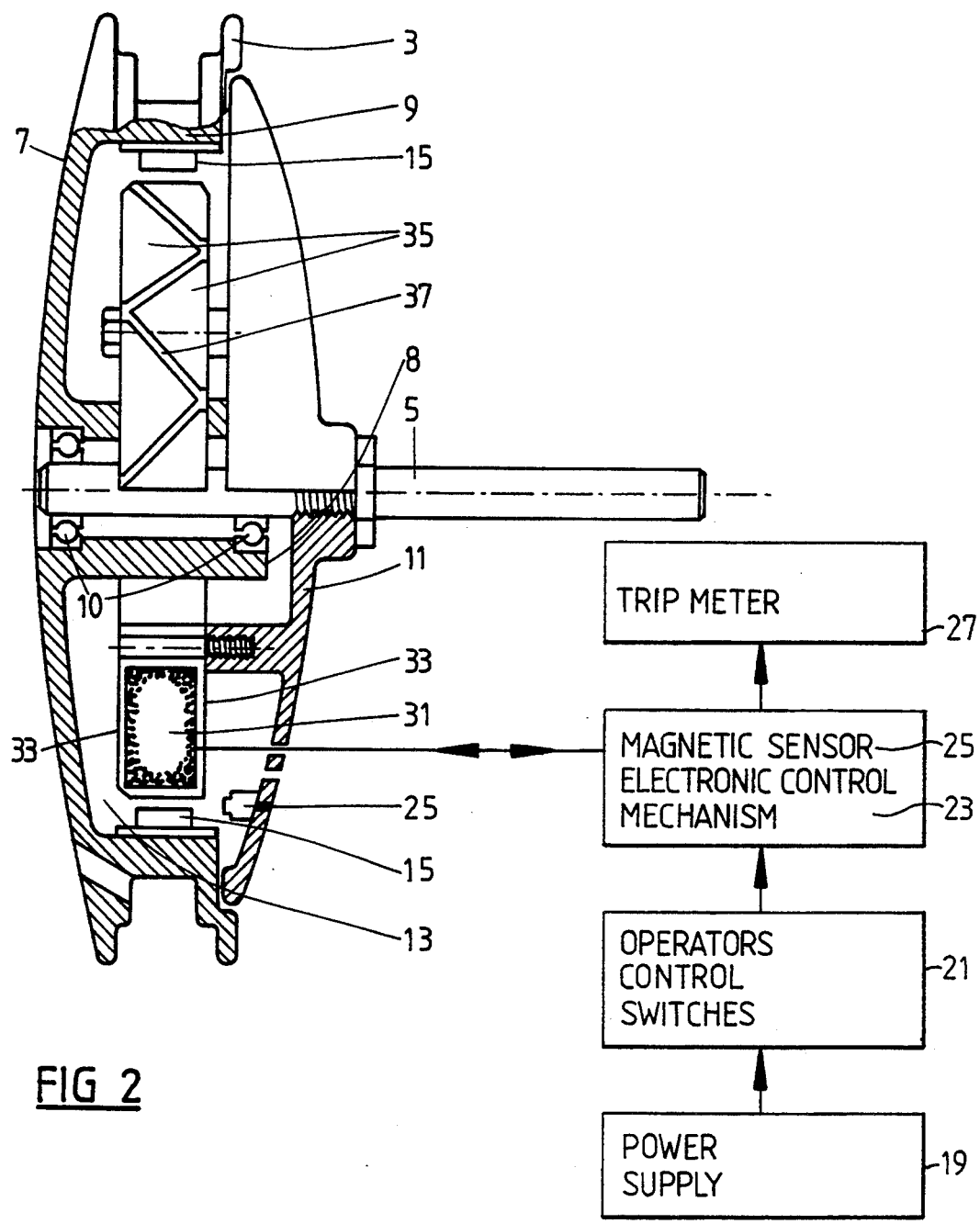
FIG. 2 is a partially schematic sectional view of another preferred embodiment of a drive device in accordance with the present invention.

The device shown in FIGS. 2 and 3 is similar to that shown in FIG. 1 in many respects and like numerals in the figures denote like parts.

The device comprises a continuous electromagnetic field coil 31 connected to the inner side wall 11 and positioned so that there is an annular gap between the magnets 15 and an outer surface of the electromagnetic field coil 31. The electromagnetic field coil 31 comprises a continuous annular coil of wire and a plate 33 on each side of the wire coil. Each plate 33 terminates in a plurality of triangular fingers 35 which extend across and form part of an outer surface of the electromagnetic field coil 31 which faces the magnets. The triangular fingers 35 are arranged side by side around the outer surface so that a triangular finger 35 of one plate is adjacent to the triangular fingers 35 of the other plate 33 and the edges 37 of the triangular plates are parallel. With such an arrangement, in use, the electromagnetic field coil 31 generates a plurality of magnetic fields of opposite plurality around the outer surface.

The use of triangular fingers 35 and the arrangement of the fingers 35 as described above ensures that there is constant, smooth drive applied to the golf buggy. In this regard, as a magnet 15 moves from a position closest to a finger of one plate 33 to a position closest to a finger 35 of an adjacent plate 33 there is a steady decrease in the repulsion force applied to the magnet 15 by the finger 35 of the one plate 33 and a complementary increase in the attractive force applied by the finger 35 of the adjacent plate 33.

A further consequence of the use of triangular fingers 35 and the arrangement of the fingers 35 as described above, which is particularly important, is that the wheel can free-wheel when the device is not actuated. This is important for golf buggies, and other vehicles which are adapted to be pushed or pulled by an operator, since there are many situations in which it is only necessary to push or pull a golf buggy a short distance and in these situations it may be preferred by a golfer to simply push or pull the golf buggy rather than actuate the drive device. The free-wheeling feature is due to the arrangement of the fingers 35, and in particular the angling of the gaps between adjacent fingers 35, so that the fingers 35 provide a continuous cover around the whole of the circumference of the electromagnetic field coil 31. In other words, the arrangement is such that there are no axial gaps between adjacent fingers 35. As a consequence, when the device is inoperative there will be substantially uniform attraction of the magnets 15 to the fingers 35 around the circumference of the electromagnetic field coil and thus the magnets 15 will not cause the wheel to lock in the inoperative state.

Many modifications may be made to the preferred embodiment described above without departing from the spirit and scope of the present invention.

In this regard, whilst the preferred embodiment in FIG. 1 includes only a single electromagnetic field coil it can readily be appreciated that the invention is not limited to this construction and could include a plurality of electromagnetic field coils.

Furthermore, it is within the scope of the present invention to modify the arrangement shown in FIGS. 2 and 3 to include a series of magnets, for example button magnets, around the internal circumference of the electromagnetic field coil 31 to increase the torque.

We claim:

1. A device for at least partially driving a golf buggy which is adapted to be pushed or pulled by an operator in a forward or a reverse direction, the device comprising:

(a) a wheel adapted to rotate about an axle of the golf buggy, the wheel having an internal chamber;
    (b) an electromagnetic assembly located in the chamber to provide drive for the golf buggy, the electromagnetic assembly comprising, (i) a plurality of spaced-apart magnets arranged in a circular array for rotation with the wheel, and (ii) an electromagnetic field coil for generating a magnetic field located in a stationary position with respect to the magnets between the axle and the magnets, the electromagnetic field coil being positioned so that there is an annular gap between the electromagnetic field coil and the magnets, the electromagnetic field coil being adapted to generate a plurality of magnetic fields of opposite polarity around an outer surface of the electromagnetic field coil that faces the magnets, the electromagnetic field coil comprising a continuous coil of wire, a first plate extending across one side of the wire coil and terminating in a series of spaced-apart fingers which form a part of the outer surface of the electromagnetic field coil, and a second plate extending across the other side of the wire coil and terminating in a series of spaced-apart fingers which form another part of the outer surface of the electromagnetic field coil, the fingers of the first plate alternating with the fingers of the second plate, whereby in use, when a direct current is passed through the wire coil, the magnetic field generated is transferred to the plates with the result that the polarity of the magnetic field of the fingers of the first plate is opposite to that of the fingers of the second plate; and
    (c) a dc power source connected to the electromagnetic field coil to energize the electromagnetic field coil to generate the magnetic field.

2. The device defined in claim 1, wherein the magnets are arranged so that one end of each magnet faces the chamber and the ends of adjacent magnets are of opposite plurality.

3. The device defined in claim 2, wherein the magnets are connected to a circumferential wall of the chamber.

4. The device defined in claim 3, wherein there are the same number of magnets and fingers.

5. The device defined in claim 4, wherein each finger is triangular with the apex positioned proximate the respective opposite side of the electromagnetic field coil.

6. The device defined in claim 5, wherein the edges of adjacent triangular fingers are parallel.

7. A device for at least partially driving a golf buggy which is adapted to be pushed or pulled by an operator in a forward or a reverse direction, the device comprising:

(a) a wheel adapted to rotate about an axle of the golf buggy, the wheel having an internal chamber;
    (b) an electromagnetic assembly located in the chamber to provide drive for the golf buggy, the electromagnetic assembly comprising, (i) a plurality of spaced-apart magnets arranged in a circular array for rotation with the wheel, and (ii) an electromagnetic field coil for generating a magnetic field located in a stationary position with respect to the magnets between the axle and the magnets, the electromagnetic field coil being positioned so that there is an annular gap between the electromagnetic field coil and the magnets, the electromagnetic field coil being adapted to generate a plurality of magnetic fields of opposite polarity around an outer surface of the electromagnetic field coil that faces the magnets, the electromagnetic field coil comprising a continuous coil, a first member extending across one side of the coil and terminating in a series of spaced-apart fingers which form a part of the outer surface of the electromagnetic field coil, and a second member extending across the other side of the coil and terminating in a series of spaced-apart fingers which form another part of the outer surface of the electromagnetic field coil, the fingers of the first member alternating with the fingers of the second member whereby, in use, when a direct current is passed through the coil, the magnetic field generated is transferred to the members with the result that the polarity of the magnetic field of the fingers of the first member is opposite to that of the fingers of the second member; and
    (c) a dc power source connected to the electromagnetic field coil to energize the electromagnetic field coil to generate the magnetic field.

* * * * *